No. 686,137. Patented Nov. 5, 1901.
U. G. ROGERS.
SOLENOID GRADUATING TUBE.
(Application filed May 24, 1901.)

(No Model.)

WITNESSES:
Geo. W. Taylor
C. Sedgwick

INVENTOR
Ulysses G. Rogers
BY
A. P. Thayer
ATTORNEY

UNITED STATES PATENT OFFICE.

ULYSSES G. ROGERS, OF NEW YORK, N. Y.

SOLENOID GRADUATING-TUBE.

SPECIFICATION forming part of Letters Patent No. 686,137, dated November 5, 1901.

Application filed May 24, 1901. Serial No. 61,792. (No model.)

*To all whom it may concern:*

Be it known that I, ULYSSES G. ROGERS, a citizen of the United States of America, and a resident of New York city, county and State of New York, have invented certain new and useful Improvements in Bead-Headed Tubes, of which the following is a specification.

My invention relates more particularly to bead-headed insulating-tubes such as are used in solenoid-magnets for graduating the magnetic attraction by shifting it along the core as a cover thereto for intercepting the magnetic influences between the core and the energized coil of the magnet more or less to regulate the strength of the same, the head being employed for the handle by which to manipulate the tube, as hereinafter described, reference being made to the accompanying drawings, in which—

Figure 1:
Figure 2:
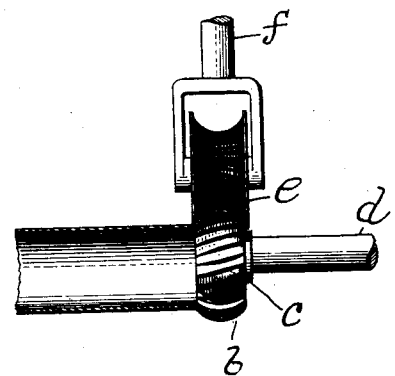

Figure 1 is a side view of my improved solenoid-core tube. Fig. 2 is a side view of the instrumentalities employed for producing the head and a longitudinal section of a tube in process of the formation of the head.

A represents the plain body of the tube, and $b$ represents the head, said head being spun from the inside outward and projected as a bead, and preferably knurled or milled on the surface for better hold in the grip of the fingers. In producing such heads I employ a tool consisting of the milled head $s$, carried on the end of a stem $d$, such as may be inserted in the jaws of a lathe-chuck and be rotated thereby, said stem being smaller than the head and the diameter of the head being such relatively to the tube on which the head is to be produced that it can enter the bore of the tube to begin with, and together with such internal tool I employ for the outside effect a rotatory grooved spinner $e$, carried in the forks of a staff $f$, which is to be carried in the tool-holder of the cross-slide of the lathe suitably for spinning up the bead $b$ on the tube near one end when said end is suitably placed on the milled head $c$. The end is thus expanded, so as to form a suitable head $b$, and though formed over and contracted on the rounded sides of the forming-head $c$ offers no resistance to removal of the completed head of the tube from the forming-head. A tube having such a head is produced cheaper than as commonly made by fitting on a ring or upsetting the end of the tube.

What I claim as my invention is—

The article of manufacture consisting of a headed solenoid graduating-tube, said head consisting of an outwardly-expanded spun bead-rib formed near one end.

Signed at New York city this 21st day of May, 1901.

ULYSSES G. ROGERS.

Witnesses:
C. SEDGWICK,
J. M. HOWARD.